Oct. 16, 1945.  A. F. KALMAR  2,386,954
PROCESS OF TREATING FRUIT
Filed March 22, 1943
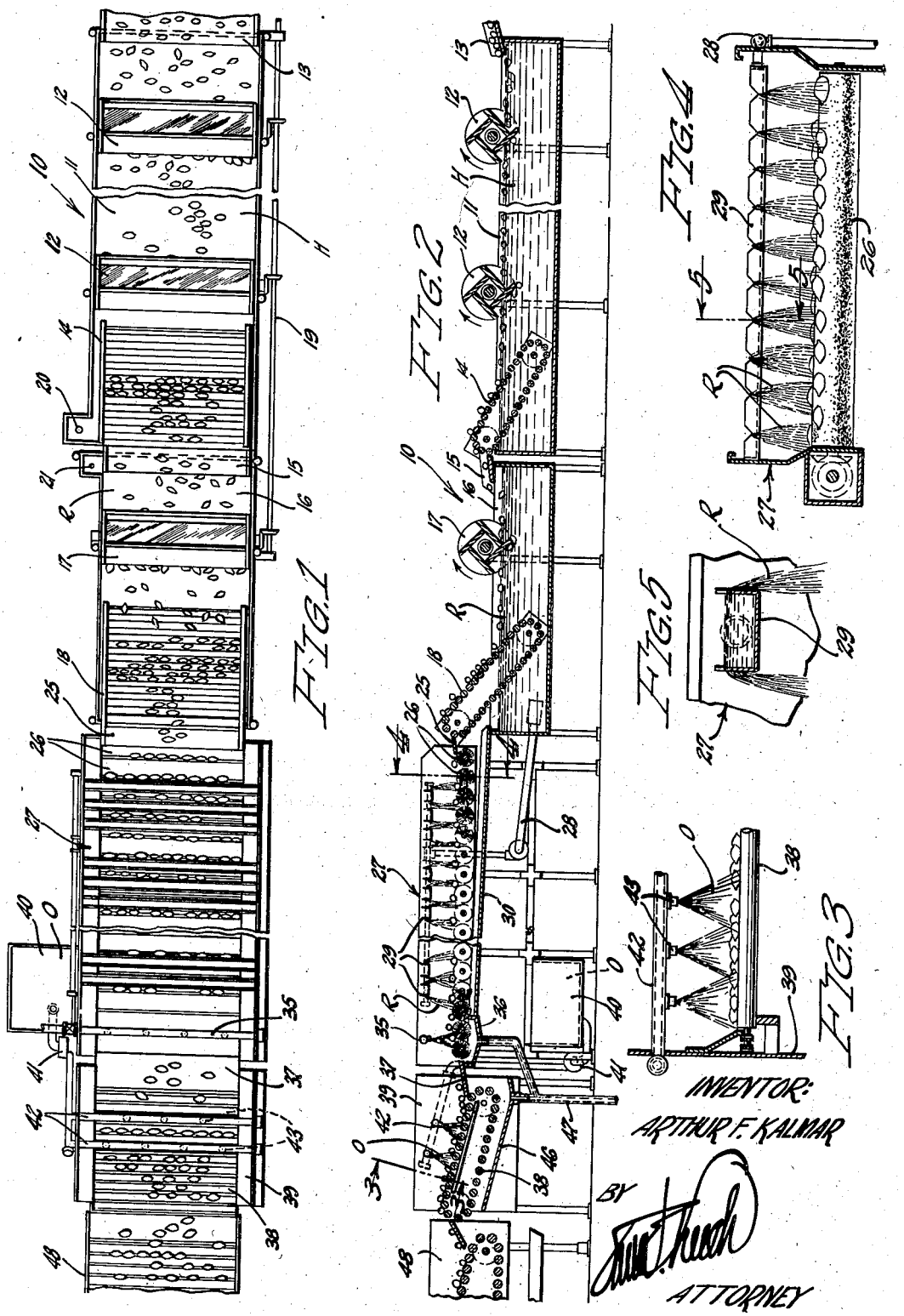
INVENTOR:
ARTHUR F. KALMAR
ATTORNEY Patented Oct. 16, 1945

2,386,954

UNITED STATES PATENT OFFICE 2,386,954

PROCESS OF TREATING FRUIT

Arthur F. Kalmar, Riverside, Calif., assignor to Food Machinery Corporation, San Jose, Calif., a corporation of Delaware Application March 22, 1943, Serial No. 480,007

9 Claims. (Cl. 99—156)

This invention has to do with the treatment of fruit and vegetables for the prevention of decay. Although especially useful in the treatment of citrus fruit, it is likewise adaptable for treating a wide variety of fruits and vegetables, including apples, tomatoes and cantaloupes.

It is a broad object of this invention to provide an improved process for treating fresh whole fruit when preparing this for market, to prevent decay thereof caused by blue and green mold during the considerable period of time which often elapses between the harvesting of the fruit and its ultimate consumption.

The decay of fresh fruit and vegetables, and particularly of citrus fruit, results mainly from infection taking place in injuries received in the picking and handling of the fruit incidental to its being harvested. To prevent this infection causing decay the fruit is generally disinfected shortly after it arrives at the packing house. To be suitable for this purpose, any disinfecting agent must be applied so that it extends into the cuts and punctures present in the rind of the fruit. This agent must also have no tendency to burn or injure the rind of the fruit.

Even though disinfected in this manner, the fruit is subject to re-infection by the introduction of mold spores present in the air into the rind injuries which did not heal as a result of said disinfection. As considerable decay is often caused by this re-infection, efforts have been made to find a suitable agent which can be applied to the fruit so as to penetrate the injuries and remain active there so as to kill any mold spores having access to these injuries.

It is another object of my invention to provide a process of treating fruit in which the optimum agents and conditions are brought to bear upon the fruit for disinfecting the same, and the optimum agents and conditions are also brought to bear upon the fruit for immunizing the same against reinfection.

While applicable to other fruits and vegetables, the process of my invention is especially useful in the treatment of lemons, as it presents a solution to many problems met with in the preparation of lemons for market, and hitherto inadequately solved.

Lemons are picked according to size, and a large portion of these are green when picked and are stored for as much as several months to permit the fruit to ripen and acquire a natural lemon color before being packed for shipment. Some of the fruit when picked is, of course, already ripe and yellow in color, but the greater portion is as yet unripe and is sorted before being stored according to whether its surface may be classified as silver, light green, or dark green in hue. The darker the color of the fruit, of course, the longer it must remain in storage before it attains a lemon color and is ready for packing.

To prevent decay during storage, from the causes aforestated, the practice generally followed in harvesting lemons prior to my invention has been to treat the lemons at the time they are washed, before placing them in storage, with a hot solution of soda ash. To prevent reinoculation of the fruit during its long storage, the soda ash solution was not rinsed from the fruit, so that the surface of the fruit was covered with a thin film of soda ash when the solution dried. Sweating of the fruit in storage, which takes place not infrequently in California, produced a concentrated solution of soda ash on the rind of the fruit, which saponified the oils and waxes present on the rind. This was found to produce a substantial acceleration of the shrinkage rate of the fruit. Another difficulty with the soda ash treatment was the fact that it was an effective fungicide only when applied at a temperature of from 110 to 120 degrees Fahrenheit, and that to prevent the oleocellosis or green spotting of the lemons by the releasing of lemon oil from the rinds by the heat, it was necessary for the lemons to be temporarily stored on the floor of the packing house from one to three days before treating the lemons and placing them in the ripening storage rooms. This extended delay between the picking and washing of the lemons caused a certain portion of the rind wounds in the fruit to heal over, thereby trapping mold fungus therein, so that these wounds would not be disinfected by the soda ash and would continue to infect and ultimately cause decay of the fruit.

It is an object of my invention to provide a process for treating lemons by which the lemons may be treated immediately upon their coming into the packing house from the field, which will disinfect all the injuries in the lemon rind before these have an opportunity of healing over, and which will immunize these injuries against re-infection during succeeding periods taken up by the storage and marketing of the fruit, and which will not increase the normal shrinkage rate of the lemons.

It is another object of my invention to provide a process of treating lemons, as aforesaid, which will not only not increase the normal shrinkage rate of lemons, but which can be employed to control and reduce, as desired, said shrinkage rate.

One class of agents suggested as suitable for both disinfecting citrus fruit and then immunizing it against subsequent re-infection are water soluble salts of hydroxy diphenyl. The most available salt of this class for this purpose is sodium orthophenylphenate. (See U. S. Letters Patent No. 2,054,392, to J. N. Sharma.) In order for this agent to be used for this dual purpose, the fruit must be submerged in a solution of the agent, or the solution flooded over the fruit so that a considerable body of the solution must be prepared and used over and over again on the fruit. This agent has a tendency to hydrolyze when in a dilute solution, forming the insoluble hydroxy diphenyl which is toxic to fruit and causes burning of the rind thereof. The suggestion is made in the Sharma patent (supra) that a certain amount of alkali, such as sodium hydroxide, be added to the solution of sodium orthophenylphenate as a hydrolysis depressant to prevent hydrolysis of this agent and permit its use as a fungicide on citrus fruit. In attempting to use this agent for the initial disinfection of citrus fruit, which necessarily involves contacting the fruit over and over again with the same body of solution, I find that the free alkali in the solution reacts with $CO_2$ absorbed from the air, so that very close attention has to be paid to the solution to keep enough alkali therein to depress hydrolysis of the orthophenylphenate without getting so much alkali in the solution that the alkali itself will burn the fruit.

As will be pointed out hereinafter in describing my invention, I have discovered that sodium orthophenylphenate may be practically applied in connection with the use of a hydrolysis depressant for the purpose of immunizing fruit from re-infection.

I have also discovered, and it is an object of my invention to provide, a mode of applying this agent in combination with other means for disinfecting the fruit initially so as to give a commercially practicable method which performs both functions of disinfecting the fruit and then immunizing it against re-infection. The process of my invention thus involves the use of a primary agent, the principal function and purpose of which is sterilization, and a secondary agent, the principal function and purpose of which is immunization.

Among the more powerful disinfectants which have had wide use in the disinfecting of citrus fruit, is sodium hypochlorite. (See Slater Patent No. 1,842,696.) This agent has enormous advantages derived from the fact that it operates at normal atmospheric temperatures, thus making it unnecessary to heat the bath in which it is applied or to heat the fruit in processing it.

Although a powerful fungicide and completely non-toxic to the fruit in customarily used concentrations, sodium hypochlorite cannot serve as an immunizer, as it breaks down within a relatively short time into products of reaction which are ineffective as fungicides. Moreover, sodium hypochlorite reacts with sodium orthophenylphenate, under the pH conditions normally existing in hypochlorite solutions applied to fruit, to form sodium chlororthophenylphenate a compound which is much less potent against blue and green mold that either of the reactants. (See "Dipping experiments with oranges," by J. M. Rattray, pp. 170–176, Report of Low Temperature Research Laboratory, Department of Agriculture and Forestry, Division of Plant Industry, Union of South Africa, for the year June 1937 to June 1938, published 1939 by Government Printer, Pretoria.)

I have discovered that even though the hypochlorite be thoroughly rinsed from the fruit before applying sodium orthophenylphenate thereto, sufficient quantities of hypochlorite are retained in the cuts and punctures in the rind of the fruit, which it is particularly necessary to immunize, and that this hypochlorite has such a pH value, generally above 10, that any sodium orthophenylphenate which is thereafter applied without prohibitive delay will penetrate into the injuries and be converted into sodium chlororthophenylphenate.

It is another object of my invention, therefore, to overcome this nullification of the orthophenylphenate and to provide a dual process of sterilizing and immunizing fruit, in which the primary or sterilizing step is performed by a hypochlorite of an alkali forming metal, and the secondary or immunizing step is performed by a water soluble salt of hydroxy diphenyl. By alkali forming metal, I mean those metals (like sodium and calcium) the oxides and hydroxides of which are commonly referred to as "alkalies."

It is a further object of my invention to provide a process of treating fruit in which a water soluble salt of hydroxy diphenyl may be applied to the fruit without the necessity for constantly watching the alkalinity of the solution to maintain therein a suitable quantity of hydrolysis depressant.

Yet another object of my invention is to provide a process of treating fruit having one or more of the objects aforestated, which may be performed in a manner to accomplish controlled reduction of the shrinkage rate of the fruit treated.

The process of my invention is preferably performed in connection with the washing of the fruit, and this washing generally requires passing of the fruit through a solution of detergent and the subsequent scrubbing of the fruit with brushes in a washing machine while the detergent solution is flooded over the fruit. When the process of my invention is thus performed, the fruit is first treated with a bath of a solution of sodium hypochlorite for a period of from four to five minutes, this solution being preferably at a temperature of about 70 degrees Fahrenheit.

Although in some instances a lower strength of hypochlorite solution is desirable, this solution when used on lemons and other citrus fruit, preferably contains .3% to 3.% hypochlorite by weight. A wetting agent may also be, and preferably is, added to this solution, so as to assist in loosening the scale adhering to the fruit without the necessity of elevating the temperature of the latter, and to cause the hypochlorite to readily wet all surfaces contacted thereby, including the mold spores themselves. This wetting agent also promotes the penetration of the hypochlorite solution into all the cuts and punctures of the rind of the fruit, thereby resulting in a disinfection of all these injuries. A wetting agent found especially suitable for this purpose is sodium secondary tetradecyl sulfate which is commercially known as "Tergitol No. 4."

A buffer to maintain the pH between about 8.6 and 9.4 is also preferably added to the hypochlorite solution. This increases the fungicidal activity of the hypochlorite. Suitable buffers for this purpose are borax or a mixture of disodium phosphate and sodium carbonate.

The fruit is next delivered into the detergent washing solution in which I place a reducing agent which operates rapidly on any hypochlorite present on the fruit, to reduce this to a relatively inert compound. An agent suitable for this purpose may be selected from a group as follows: phosphitess sulphites, bisulphites, metabisulphites, and thiosulphates of alkali forming metals. I have found sodium thiosulphate is especially suitable for use as a reducing agent in this solution, as it is non-toxic to fruit, so that there is no necessity for placing a limit on the strength with which it is used. The strength of this agent should be at least .05%, and for the performance of this function need not be more than 1.5% by weight.

Following this treatment in this combined solution of detergent and reducing agent, the fruit is delivered to a washer in which is scrubbed by brushes while having said detergent solution flooded thereover.

The fruit is then rinsed by a spray of fresh water, and delivered to a suitable conveyor. While fruit is carried on this conveyor it is treated with a pressure spray of an immunizing solution. This solution contains a water soluble salt of hydroxy disphenyl, together with a hydrolysis depressant in quantity sufficient to maintain the pH value of the solution preferably within a range of about 10.2 to 11.5. The immunizing agent preferably used in the solution is sodium orthophenylphenate, and the preferable quantity is from about .02% to abolut 1.5% by weight. The hydrolysis depressant used in this solution is preferably sodium hydroxide. The exactly correct amount of this depressant is maintained in this solution by making this solution up daily in an amount suitable for the day's run, and then applying this solution to the fruit only once by the spray method, so that the solution is not aerated until it is sprayed onto the fruit. The fruit is then allowed to dry and the water thus evaporated from the immunizing solution, leaving crystals of sodium orthophenylphenate or a concentrated solution thereof, on the surface of the fruit and in the cuts and punctures in the rind thereof, before an opportunity occurs for the hydrolysis and conversion of this agent into its oil soluble, rind-burning form.

Hydrolysis of the sodium orthophenylphenate after it has been applied in the process of my invention, cannot occur, as even though crystals of this agent on the rind of the fruit may be redissolved when the fruit sweats, the solution produced thereby is always a concentrated one, whereas hydrolysis can take place only in a dilute solution.

The process of my invention is adapted to be performed as aforestated, either in conjunction with a washing process or otherwise, and it may also include the application of an aqueous wax emulsion commonly known as "water wax" in the solution of immunizing agent, so that the fruit is not only immunized, but a deposit of wax made on the rind thereof to give a desired degree of reduction of the shrinkage of the fruit. This added feature of my process is especially desirable when treating lemons produced in areas where atmospheric conditions are such that otherwise considerable shrinkage would be caused during the normal storage periods.

Specific formulas for the three solutions of my process which I have found to give especially good results on fresh whole lemons in California, are as follows:

Disinfecting solution

| | Per cent by weight |
|---|---|
| Sodium hypochlorite expressed as available chlorine | .6 |
| Buffer, consisting of— | |
| Disodium phosphate | 1.25 |
| Sodium carbonate | 0.35 |
| Wetting agent consisting of Tergitol No. 4 | 0.15 |
| Water and inert salts | 97.65 |
| | 100.00 |

Solution of reducing agent and detergent

| | Per cent by weight |
|---|---|
| Detergent consisting of— | |
| Soap | 0.20 |
| Sodium carbonate | .50 |
| Reducing agent—sodium thiosulphate | 0.15 |
| Water | 99.15 |
| | 100.00 |

Immunizing solution

| | Per cent by weight |
|---|---|
| Sodium orthophenylphenate | 0.15 |
| Hydrolysis depressant—sodium hydroxide | 0.02 |
| Water | 99.83 |
| | 100.00 |

Typical formulas for the immunizing solution of my process when this process is also employed for water-waxing the fruit, are as follows:

I.

| | Per cent |
|---|---|
| Paraffin wax | 2.0 |
| Nopco #2251 (emulsifying agent) | 0.5 |
| Sodium orthophenylphenate | 0.15 |
| Sodium hydroxide | .02 |
| Water | 97.33 |
| | 100.00 |

II.

| | Per cent |
|---|---|
| Paraffin wax | 1.5 |
| Beeswax | 0.5 |
| Triethanolamine oleate | .4 |
| Sodium hydroxide | .02 |
| Sodium orthophenylphenate | .15 |
| Water | 97.43 |
| | 100 00 |

III.

| | Per cent |
|---|---|
| Paraffin wax | 1.0 |
| Atlas #2000 (emulsifying agent) | 0.2 |
| Sodium orthophenylphenate | .15 |
| Sodium hydroxide | .02 |
| Water | 98.63 |
| | 100.00 |

In general, the ingredients of the immunizing water-waxing solution of my invention should come approximately within the following brackets:

Waxy material about 1–5%
Emulsifying agent about .2 to 2%
Sodium orthophenylphenate up to 1.5%
Hydrolysis depressant sufficient to maintain the pH above 10

The process of my invention when performed commercially, requires the use of apparatus. In the accompanying drawing:

Fig. 1 is a plan view of an apparatus suitable for performing the process of my invention.

Fig. 2 is a side elevational view of Fig. 1.

Fig. 3 is a fragmentary enlarged detailed sectional view taken on line 3—3 of Fig. 2.

Fig. 4 is an enlarged detailed sectional view taken on line 4—4 of Fig. 2.

Fig. 5 is a still further enlarged detailed sectional view taken on line 5—5 of Fig. 4.

Referring specifically to the drawing, this illustrates an apparatus 10, which includes a solution tank 11, having submerging rotors 12, a delivery board 13, over which fruit is delivered into the receiving end of the tank, and a discharge conveyor 14 for removing fruit from the opposite end of the tank. Fruit discharged from the latter conveyor travels over a delivery board 15 into a solution tank 16 having one or more submerging rotors 17, and a discharge conveyor 18. During the operation of the apparatus 10, the rotors 12 and 17 are slowly rotated by a shaft 19 in the direction indicated by the adjacent arrows.

Tanks 11 and 16 are provided with drains 20 and 21. Fruit discharged from the elevator 18 travels over a delivery board 25 onto rotating brushes 26 of a transverse fruit washer 27. A pump system 28 delivers solution from the tank 16 to a series of notched troughs 29, overlying the brushes 26, so that the fruit resting on these brushes and brushed as the latter rotate, is flooded with solution from the tank 16, as clearly shown in Figs. 2, 4 and 5. A drain pan 30 returns this solution to the tank 16. The troughs 29 do not overlie the final brushes 26 in the washer 27, and a fresh water supply pipe 35, extending over the valley between the last two of these brushes, sprays fresh water downwardly on the fruit in this valley to rinse solution from this fruit, the rinse water being collected in a drain pan 36 therebelow.

When discharged from the washer 27 the fruit travels over a drop board 37 onto a short upwardly inclined roller conveyor 38 of an immunizer 39. The immunizer 39 is equipped with a solution tank 40, from which a pump 41 draws solution and delivers this under pressure to a pair of manifold supply pipes 42, nozzles 43 of which are staggered so as to thoroughly cover all of the fruit passing therebeneath on the conveyor 38, with a relatively hard spray of solution from the tank 40. Beneath the conveyor 38 is provided a drain pan 46. A drain conduit 47 leads from the drain pans 36 and 46 to the sewer.

When discharged from the immunizer 39 the fruit may be received by any suitable piece of apparatus for handling the same, a sizer 48 being shown in the drawing as located to receive this fruit.

In employing the apparatus 10 to perform the process of my invention, the tank 11 is provided with a solution H, which is the hypochlorite solution of my invention; the tank 16 is provided with a solution R, which is the detergent and reducing agent solution of my invention, while the tank 40 is provided with a solution O, which is the solution of a water soluble salt of hydroxy diphenyl of my invention. This latter is, of course, preferably sodium orthophenylphenate.

It is believed clear from the previous description of the process of my invention and of the apparatus 10, how the latter functions in performing this process. The fruit delivered over the board 13 travels through the solution H, in which the hypochlorite is introduced into all of the cuts and punctures in the rind of the fruit, and the scale adhering to the rind surface is loosened up without any heating of the fruit, so that the scale will readily be removed when the fruit reaches the washer 27. At the completion of this step, the fruit is delivered by the elevator 14 into the tank 16, in which the reducing agent in the solution R attacks all traces of hypochlorite remaining on the fruit, and particularly in the punctures and cuts in the rind thereof, and reduces this hypochlorite to an inert form which will not combine with the orthophenylphenate in solution O. As the solution R is flooded over the fruit traveling through the washer 27, ample opportunity is given in this process to complete conversion of the hypochlorite before the fruit is treated with the solution O.

In the washer 27 the fruit is also thoroughly cleansed by the scrubbing action of the brushes 26 thereon, and the action of the detergents dissolved in the solution R.

The fruit then passes through the sprays of clear water delivered by the manifold 35, which rinses practically all of the solution R from the surface of the fruit. The fruit is then delivered onto the conveyor 38, where the solution O is applied thereto forcibly by the pressure produced by the pump 41. This solution is only applied to the fruit once, and any excess draining from the fruit is caught by the pan 46 and discharged to the sewer by conduit pipe 47.

The solution O in tank 40 is protected from aeration in the atmosphere so that the hydrolysis depressant therein remains throughout the day at a strength adequate to maintain the orthophenylphenate in the solution in its water soluble form, in which it is extremely effective as an immunizing agent, and preventing its being transformed by hydrolysis into its oil soluble form, which is toxic to the fruit.

When the process of my invention includes the step of water-waxing the fruit, the immunizing and water-waxing occur simultaneously as the spray of solution O contacts the fruit traveling on the conveyor 38.

What I claim is:

1. A method of protecting fresh whole fruit from decay which comprises: contacting the fruit with an aqueous solution of a hypochlorite of an alkali forming metal, subsequently contacting said fruit with an aqueous solution containing a reducing agent selected from a group consisting of phosphites, sulphites, bisulphites, metabisulphites and thiosulphates of alkali forming metals, and contacting said fruit with an aqueous solution containing a water soluble salt of hydroxy diphenyl.

2. A method of protecting fresh whole fruit from decay which comprises: contacting the fruit with an aqueous solution of a hypochlorite of an alkali forming metal, subsequently contacting said fruit with an aqueous solution containing a reducing agent selected from a group consisting of phosphites, sulphites, bisulphites, metabisulphites and thiosulphates of alkali forming metals, and contacting said fruit with an aqueous solution containing a water soluble salt of hydroxy diphenyl and a hydrolysis depressant sufficient to maintain the pH above 10.

3. A method of protecting fresh whole fruit from decay which comprises: contacting the fruit with an aqueous solution of a hypochlorite of an alkali forming metal, thereafter contacting said fruit with an aqueous solution containing a reducing agent selected from a group consisting of phosphites, sulphites, bisulphites, metabisulphites and thiosulphates of alkali forming metals, and contacting said fruit with an aqueous medium containing from about .02% to about 1.5% by weight of a water soluble salt of hydroxy diphenyl and a hydrolysis depressant sufficient to maintain the pH above 10.

4. A method of protecting fresh whole fruit from decay which comprises: contacting the fruit with an aqueous solution of sodium hypochlorite, subsequently contacting said fruit with an aqueous solution containing a reducing agent selected from a group consisting of phosphites, sulphites, bisulphites, metabisulphites and thiosulphates of alkali forming metals and contacting said fruit with an aqueous medium containing from about .02% to about 1.5% by weight of sodium orthophenylphenate and a hydrolysis depressant sufficient to maintain the pH above 10.

5. A method of washing fresh whole fruit and protecting the same from decay which comprises: passing said fruit through an aqueous solution of a hypochlorite of an alkali forming metal; passing said fruit through an aqueous solution of a detergent also containing a reducing agent selected from a group consisting of phosphites, sulphites, bisulphites, metabisulphites and thiosulphates of alkali forming metals; brushing said fruit while in contact with said solution of detergent and reducing agent; rinsing said fruit; and contacting said fruit with an aqueous solution of a water soluble salt of hydroxy diphenyl containing a hydrolysis depressant sufficient to maintain the pH above 10.

6. A method of protecting fresh whole fruit from decay which comprises: contacting the fruit with an aqueous solution of a hypochlorite of an alkali forming metal; subsequently contacting said fruit with an aqueous solution of a reducing agent selected from a group consisting of phosphites, sulphites, bisulphites, metabisulphites and thiosulphates of alkali forming metals; and contacting said fruit with an aqueous solution of a water soluble salt of hydroxy diphenyl containing a waxy coating material suspended therein.

7. A method of protecting fresh whole fruit from decay which comprises: contacting the fruit with an aqueous solution of a hypochlorite of an alkali forming metal; subsequently contacting said fruit with an aqueous medium containing a reducing agent selected from a group consisting of phosphites, sulphites, bisulphites, metabisulphites and thiosulphates of alkali forming metals; rinsing said solution of reducing agent from said fruit; spraying onto said fruit an aqueous solution containing a water soluble salt of hydroxy diphenyl; and permitting said solution sprayed onto said fruit to dry thereon.

8. A method of protecting fresh whole fruit from decay which comprises: contacting the fruit with an aqueous solution of a hypochlorite of an alkali forming metal; subsequently contacting said fruit with an aqueous solution containing a reducing agent selected from a group consisting of phosphites, sulphites, bisulphites, metabisulphites and thiosulphates of alkali forming metals; rinsing said fruit with fresh water; forming an aqueous solution containing a water soluble salt of hydroxy diphenyl and a free alkali in sufficient quantity to maintain the pH above 10; confining said diphenyl solution to substantially prevent access of $CO_2$ to said solution; spraying said diphenyl solution onto said fruit; and permitting said solution to dry on said fruit.

9. A method of protecting from decay fresh whole fruit having external injuries, said method comprising: contacting the outer surface of the fruit with an aqueous solution of a hypochlorite of an alkali-forming metal, subsequently contacting said fruit with an aqueous solution containing a reducing agent selected from a group consisting of phosphites, sulphites, bisulphites, metabisulphites, and thiosulphates of alkali-forming metals, brushing said reducing agent into the injuries in said fruit and contacting said fruit with an aqueous solution containing a water soluble salt of hydroxy diphenyl.

ARTHUR F. KALMAR.